Nov. 18, 1941.　　　　A. KOWALSKY　　　　2,262,896
HARVESTER
Filed Jan. 26, 1940　　　　2 Sheets-Sheet 1
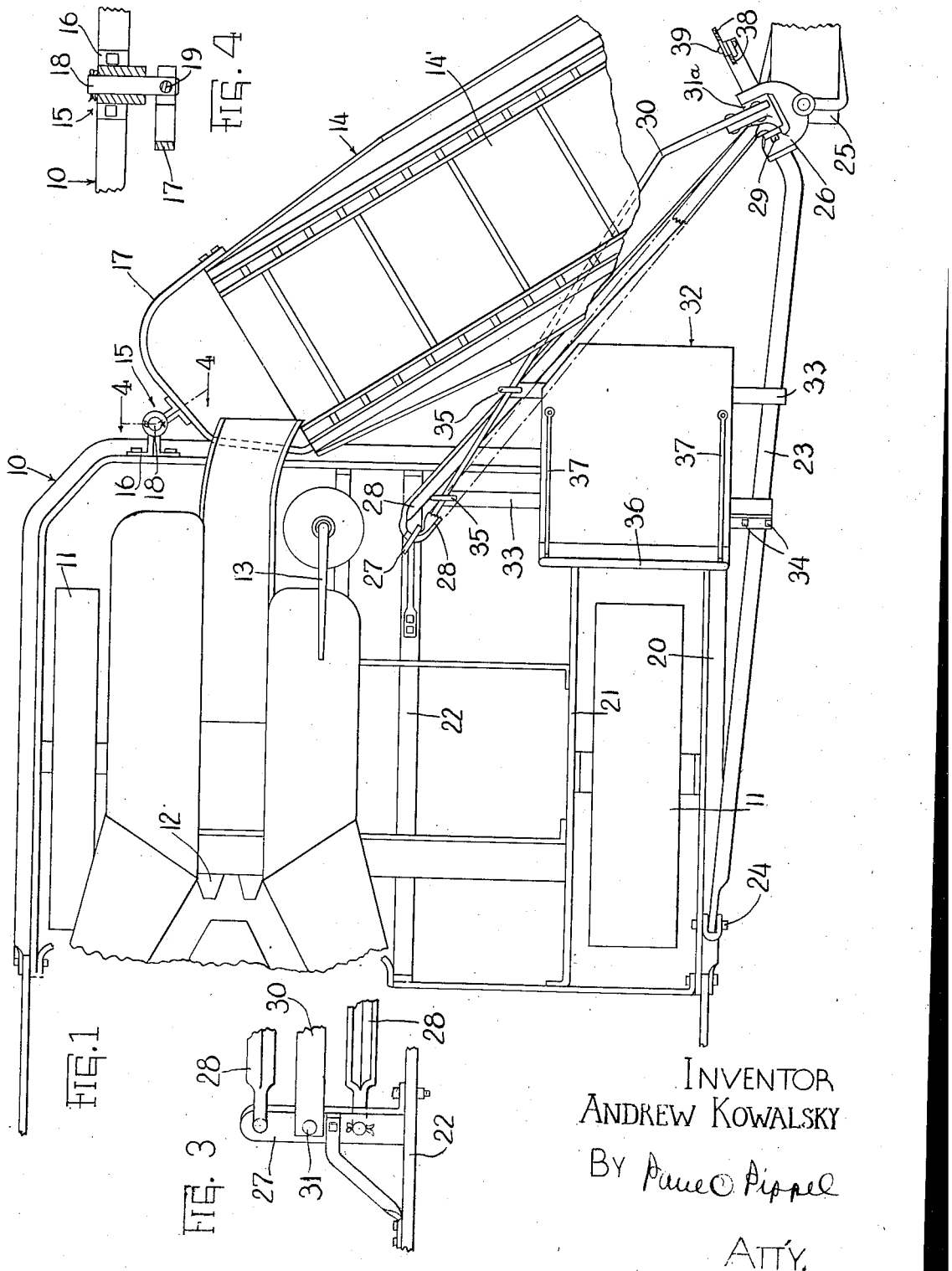
INVENTOR
ANDREW KOWALSKY
BY Paul O. Pippel
ATTY.

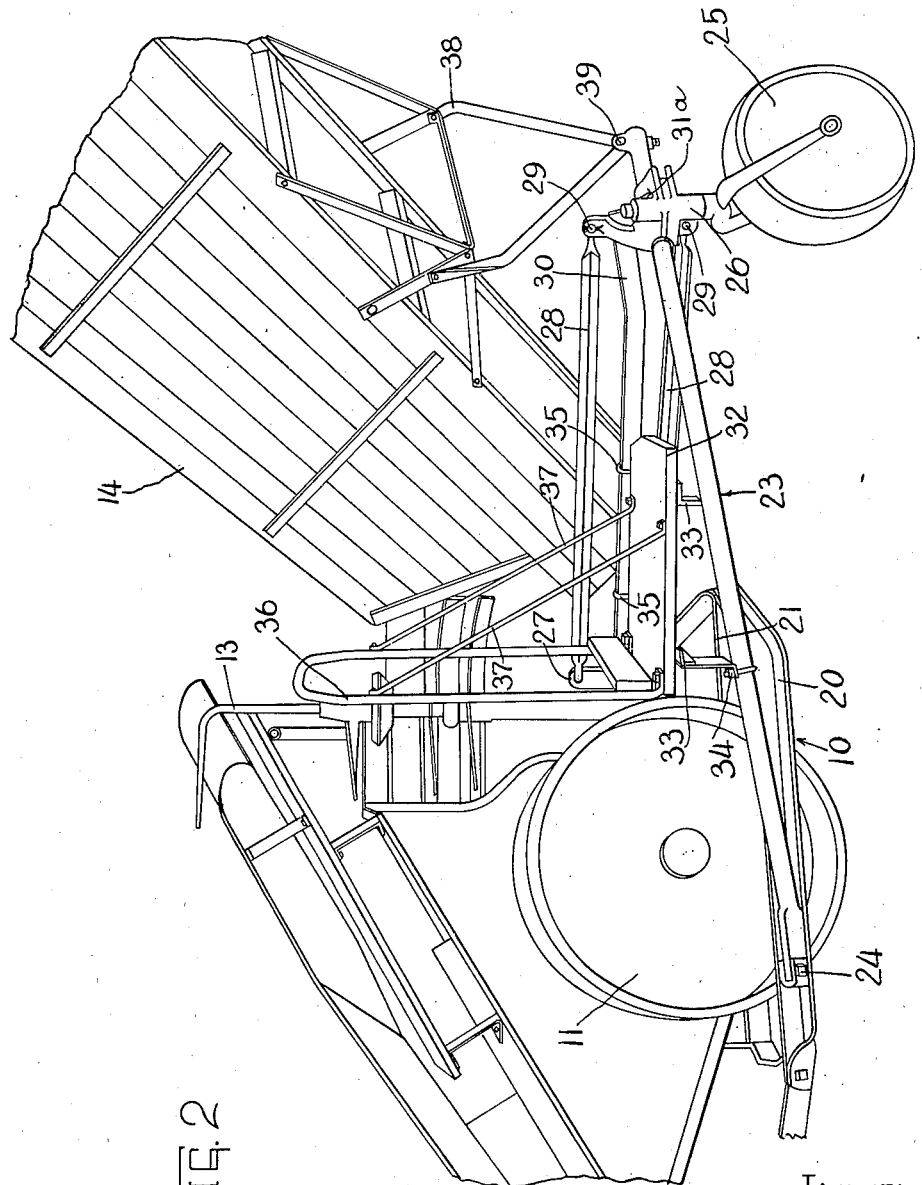

Patented Nov. 18, 1941

2,262,896

UNITED STATES PATENT OFFICE 2,262,896

HARVESTER

Andrew Kowalsky, Oak Park, Ill., assignor to International Harvester Company, a corporation of New Jersey Application January 26, 1940, Serial No. 315,795

9 Claims. (Cl. 56—71)

This invention relates to a harvester, and more particularly to an improved construction for supporting an attendant's platform and a bundle elevator.

Those familiar with the art of harvesters are acquainted with the problems encountered in the handling and conveying of bundled corn, from the discharge means on the harvester, to the particular place desired. For the purpose of conveying these bundles it has been customary to provide a bundle elevator connected to the harvester and associated with a discharge means. In order to provide a support for the bundle elevator, an auxiliary wheeled frame has been provided. This frame supports the bundle elevator and is pivotally connected to the harvester. The wheeled frame and the bundle elevator are vertically movable with respect to the harvester thus providing for a smoother operation over the uneven contour of the ground.

The bundles of corn are discharged from the discharge means onto the bundle elevator and they are then carried to a truck or other receiving means which follows the harvester in its operation through the field. In order to facilitate the uninterrupted operation of the discharge and elevating mechanism it is desirable to station an attendant near enough to the mechanism to supervise the operation thereof. For this purpose it has been customary to provide an attendant's platform adjacent the bundle elevator, said platform being mounted wholly on the harvester frame.

This type of platform mounting has been unsatisfactory for it involves a certain amount of danger to the attendant. As the harvester and the auxiliary frame ride over the uneven contour of the ground the auxiliary frame moves vertically with relation to the harvester and it is apt to injure the attendant.

The principal object of the invention, then, is to provide an improved construction for an attendant's platform.

An important object of the invention is to provide a platform, so mounted that the operation of the harvester will not endanger the attendant.

An important object of the invention is to provide an attendant's platform or a harvester, carried on an auxiliary frame.

Another important object is to provide an auxiliary frame connected to the harvester and supporting a bundle carrier at an acute angle with respect to the harvester.

A further understanding of the advantages and objects of the invention will be had from the detailed description of the structure shown in the accompanying drawings, in which:

Figure 1 is a plan view of the harvester showing the bundle loader, the attendant's platform, and the auxiliary frame;

Figure 2 is a perspective view of one side of the harvester and the related parts;

Figure 3 is a side elevational view of a portion of the harvester frame showing how the supporting brackets for the auxiliary frame are fastened to the harvester; and, Figure 4 is section taken along line 4—4 of Figure 1.

Only a sufficient portion of the harvester has been shown as is necessary to illustrate the invention. The numeral 10 indicates generally the main frame of a harvester supported on ground wheels 11. The harvester includes the usual cutting mechanism 12 and bundle discharge means 13.

At the rear of the harvester 10, as shown in Figure 1, is provided a bundle elevator 14 with elevating conveyer 14', mounted on the harvester as indicated generally at 15. This construction, as best shown in Figure 4, comprises a bracket 16, rigidly fastened on the frame 10, on which is pivoted a yoke portion 17 through the medium of pivot pins 18 and 19. The yoke portion 17 is connected to the bundle elevator 14'.

The harvester frame 10 comprises a plurality of longitudinally extending braces 20, 21, and 22. A second frame 23 extending rearwardly of the harvester frame 10 is pivotally mounted on the brace 20 through the medium of fastening means 24. The frame 23 has at its end a caster wheel 25 which supports the frame by means of a yoke and bracket member 26, pivotaly secured to the frame 23.

The longitudinally extending brace 22 on the harvester frame 10 rigidly carries a bracket 27. A plurality of parallel connecting members 28 are pivotally connected to the bracket 27 and extend rearwardly of the harvester frame 10. The connecting members 28 are pivotally connected to the second frame 23 by means of the bracket structure 26, as indicated at 29. Intermediate the connecting members 28, there is provided a supporting member 30 which is pivotally fastened to the bracket 27 as indicated at 31. This supporting member 30 extends rearwardly of the harvester and is connected to the frame 23 by means of a member 31a.

The numeral 32 indicates generaly an attendant's platform. This platform comprises a pair of parallel supporting members 33 one of which is rigidly conected at one side to the frame 23 by securing means 34. The platform 32 is further supported by means of the parallel supporting members 33, to the supporting member 30 as indicated at 35, thus providing for rigid support of the platform on the frame 23.

The attendant's platform 32 is also provided with a safety railing 36 rigidly secured to the platform by a pair of braces 37.

The frame 23 also supports the bundle carrier 14 by means of a bracket structure 38 connected to the frame 23 as shown at 39.

During the operation of the harvester, the corn is cut and bundled by the usual cutting and bundling means, and it is then discharged from the harvester onto the bundle elevator. The bundle elevator is pivotally connected at one end on the harvester frame and supported by a second wheeled auxiliary frame. This second frame is pivotally connected to the harvester frame and moves vertically with respect thereto, as the harvester travels through the field. The second frame carries a platform on which an attendant stands and supervises the operation of a discharge means and the bundle elevator. As the platform and the bundle elevator are both carried on the second frame they both move in unison vertically with respect to the harvester. There is no relative movement between the attendant's platform and the auxiliary frame, and therefore, no likelihood that the attendant will be injured by movement of the auxiliary frame.

The bundle elevator is so carried by the second frame as to be readily accessible by the attendant.

It is the intention to cover all changes and modifications of the illustrated example herein disclosed which do not in material respects constitute departures from the spirit and scope of the invention as defined in the appended claims.

What is claimed is:

1. In a harvester having a wheeled frame, a second frame connected to the first frame for vertical movement with respect thereto, material handling means movably connected to the first frame and supported on the second frame, the combination with the second frame of an attendant's platform carried by said second frame adjacent the material handling means.

2. In a harvester having a wheeled frame, a second frame connected to the first frame for vertical movement with respect thereto, a caster wheel for supporting the second frame for vertical movement as the caster wheel follows the ground contour, material handling means movably connected to the first wheeled frame and supported on the second frame, the combination with the second frame of an attendant's platform carried wholly by said second frame adjacent the material handling means.

3. In a harvester having a wheeled frame, a second wheeled frame connected to the first mentioned wheeled frame for vertical movement with respect thereto, a material handling means movably connected to the first frame and supported on the second frame for vertical movement with said second frame, the combination with the second frame of an attendant's platform associated with the second frame and movable with the material handling means and with respect to the first frame.

4. A harvester comprising a frame including harvesting mechanism and discharge means for harvested material, the combination with a discharge means of a material handling means associated with the discharge means and arranged at an acute angle with respect to the frame, a second frame pivotally connected to the first frame on an axis substantially at right angles to the direction of extension of the material handling means, and including ground engaging means, and means for supporting the material handling means on the second frame.

5. In a harvester having a frame supporting a harvesting mechanism and discharge means, the combination with the discharge means of material handling means associated with the discharge means and mounted on the frame and extending therefrom at an acute angle with respect thereto, a second frame pivotally connected to the first frame on an axis substantially at right angles to the direction of extension of the material handling means, and including ground engaging means carrying the second frame and supporting the material handling means substantially above the ground engaging means.

6. In a harvester having a wheeled frame, the combination of a material handling means movably connected to the first frame and arranged at an acute angle with respect thereto, a second frame movably connected to the first frame and supporting the material handling means, and an attendant's platform wholly carried by the second frame adjacent the material handling means.

7. In a harvester having a wheeled frame supporting a harvesting mechanism and a discharge means, the combination with the discharge means of a second frame connected to the first frame for movement with respect thereto and extending rearwardly therefrom, a ground engaging means supporting the second frame at a rear portion thereof, and a material handling means movably connected at one end to the first frame at the discharge means and extending rearwardly therefrom generally above the second frame, and means for pivotally supporting the material handling means at its other end on the second frame substantially above the ground engaging means.

8. In a harvester having a wheeled frame supporting a harvesting machine and a material handling means, the combination therewith of a second frame mounted at one side on the first frame and supported by a ground engaging means, a connecting member mounted at one end on the first frame and connected at its other end to the second frame substantially above the ground engaging means, and an attendant's platform mounted on the second frame and supported by the connecting member substantially between the material handling means and the second frame.

9. In a harvester having a frame, ground wheels respectively at each side of and supporting the frame, cutting means at the forward portion of the frame, and a discharge means mounted at the rearward portion of said frame and associated with the cutting means, the combination with the discharge means of a material handling means connected to the rear of the harvester frame and extending at an acute angle therefrom, a second frame connected at one side to the harvester frame and extending rearwardly therefrom, bracket means on the second frame for supporting the material handling means, and an attendant's platform carried by the second frame adjacent the material handling means substantially in line with one of the ground wheels and at the rear of said ground wheel.

ANDREW KOWALSKY.